May 12, 1964 W. H. LEUZE 3,132,608
CONTROLS FOR A DEPOSITOR
Filed May 4, 1961 2 Sheets-Sheet 1

INVENTOR.
WILLIAM H. LEUZE,
BY Allen & Allen
ATTORNEYS.

May 12, 1964 W. H. LEUZE 3,132,608
CONTROLS FOR A DEPOSITOR
Filed May 4, 1961 2 Sheets-Sheet 2
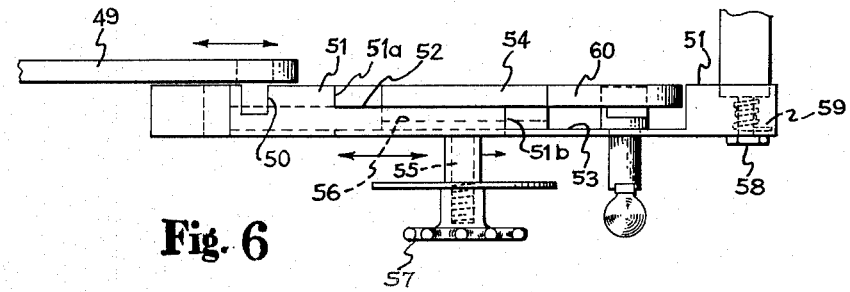
Fig. 6
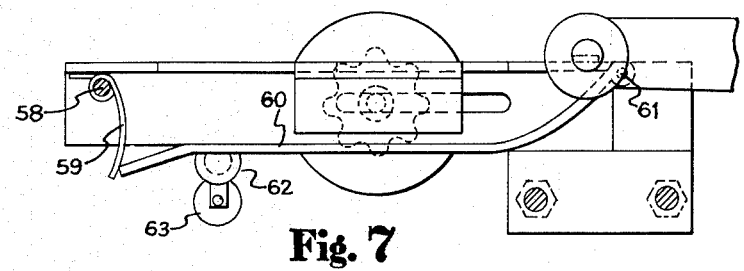
Fig. 7
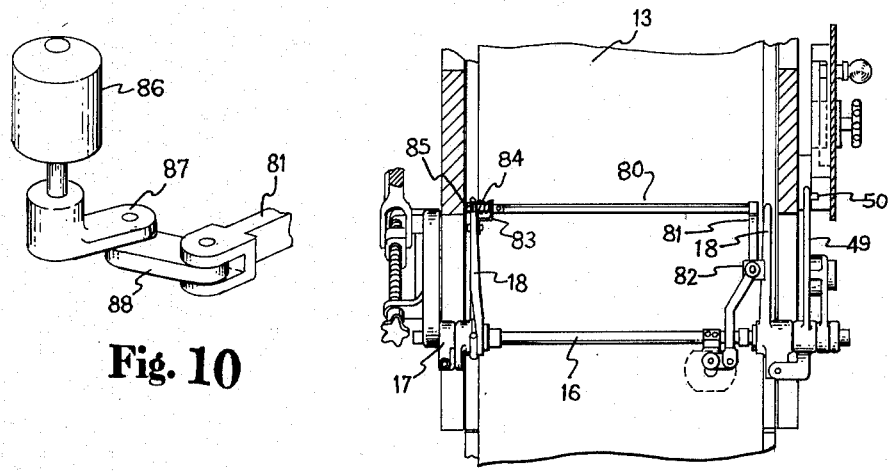
Fig. 10
Fig. 8
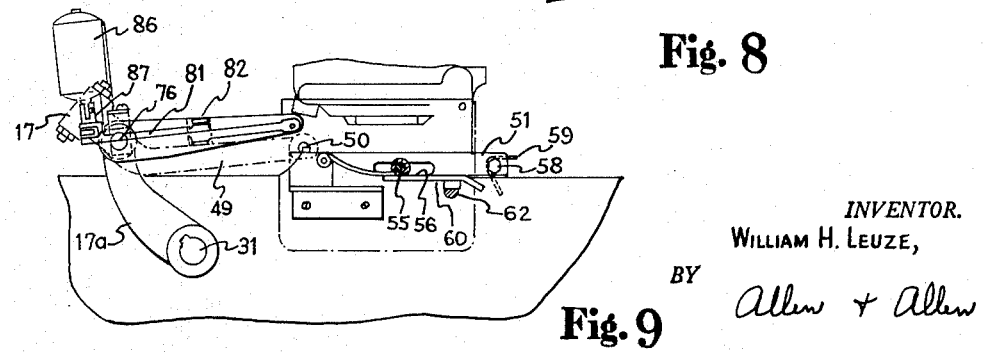
Fig. 9
INVENTOR.
WILLIAM H. LEUZE,
BY Allen + Allen
ATTORNEYS.

3,132,608
CONTROLS FOR A DEPOSITOR
William H. Leuze, Cincinnati, Ohio, assignor to Triumph Manufacturing Company, Cincinnati, Ohio, a corporation of Ohio
Filed May 4, 1961, Ser. No. 107,760
7 Claims. (Cl. 107—29)

This invention resides in the provision of improved controls for a depositor, particularly those which deposit cookie and candy, or other food, materials on a moving belt for direct transfer to a table belt or bottomer, or other equipment.

Candy and cookie depositors are well known in the art. One of these depositors, for example, may comprise a main frame and mechanism for moving a belt continuously at a uniform speed. Positioned above this belt is a hopper and die mechanism containing means for feeding material through the dies. These dies determine the shape and size of the cookie or candy. Other mechanism carries a cut-off wire or knife which reciprocates beneath the hopper and dies and cuts the extruded material whereupon the cookie or candy will fall upon the moving belt.

Problems have arisen in connection with depositors of the type just generally outlined above. It has been found that different materials, and cookies and candies of different shapes and sizes, must be handled differently if they are to be deposited uniformly and in line on the moving belt. A very important object of this invention, therefore, is to provide adjustable control means so that these candies, cookies, and other food materials, regardless of their shapes, sizes and ingredients, may be deposited uniformly and in line on the moving belt.

A specific and important object of the invention is to provide multiple controls which act together to control the drop, such controls including means to raise and lower the belt as it moves beneath the hopper and the dies, means to adjust the distance horizontally through which the cut-off wire or knife moves, and means to control the amount of downward movement of the cut-off wire or knife after it has severed the objects extruded from the dies.

Figure 1:
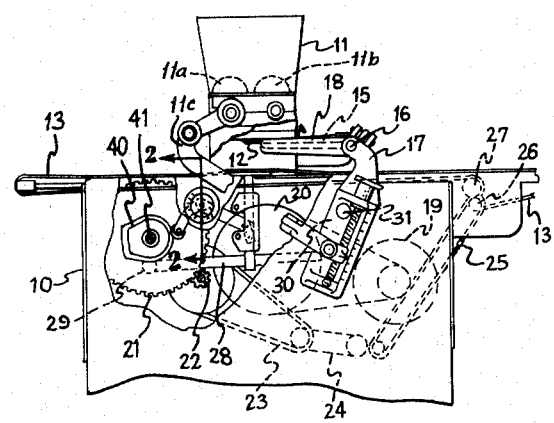
Figure 3:
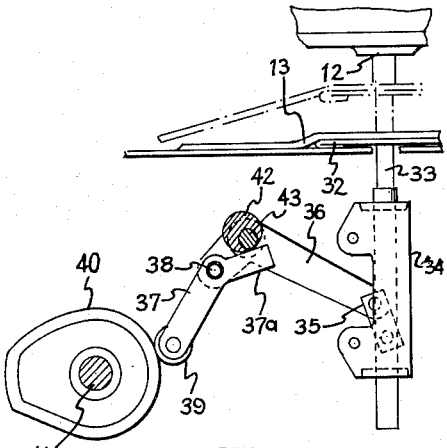
Figure 2:
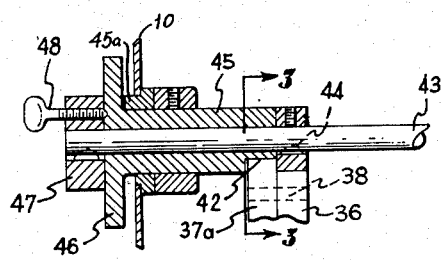
Figure 5:
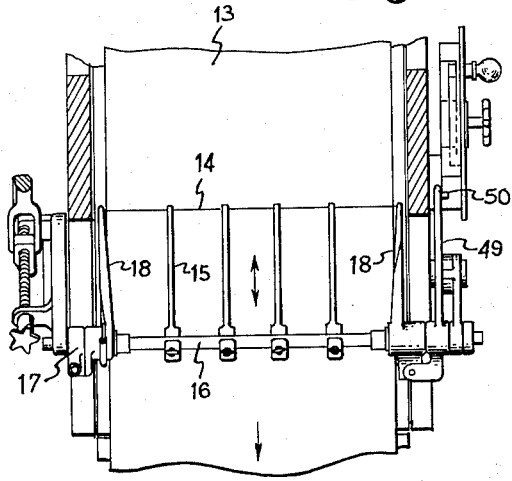
Figure 4:
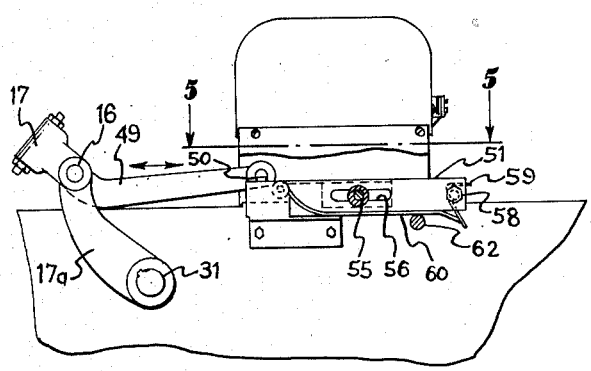

These and other objects of the invention will become apparent to those skilled in the art during the course of the following description and with reference to the accompanying drawings, in which drawings like numerals are employed to designate like parts and in which:

FIGURE 1 is a side view, with parts broken away, of the depositor of this invention, FIGURE 2 is an enlarged section on the line 2—2 of FIGURE 1, FIGURE 3 is a section on the line 3—3 of FIGURE 2, FIGURE 4 is an enlarged, fragmentary side elevation showing certain of the control mechanism included in the depositor of this invention, FIGURE 5 is an enlarged, fragmentary section taken on the line 5—5 of FIGURE 4, FIGURE 6 is an enlarged plan view of the control mechanism shown in FIGURE 4, FIGURE 7 is an enlarged side view, with parts broken away, taken from the far side of the control mechanism shown in FIGURE 4, FIGURE 8 is an enlarged, fragmentary section similar to FIGURE 5 but showing a modification of the invention, FIGURE 9 is an enlarged, fragmentary side elevation similar to FIGURE 4 but showing certain of the control mechanism included in the modified depositor of this invention, and FIGURE 10 is a fragmentary perspective view of the mechanism for imparting longitudinal reciprocation of the cutoff member.

Referring now to FIGURE 1, the main cabinet or frame of the depositor is generally indicated at 10. A hopper 11 terminating in a die 12 is supported from the frame over a moving belt 13 also mounted on the frame. It will be understood that there is mechanism, generally comprising a pair of feed rolls 11a and 11b, within the hopper 11 which carries the material downwardly therethrough so that it finally extrudes from the orifices of the die 12. The roll 11a is intermittently driven by the motor 19 through a conventional linkage including a suitable clutch (not shown). The clutch is engaged and disengaged by the movement of the arm 11c connected to the lever 30 described in more detail hereinafter. The roll 11b is essentially an idler roller, driven by the rotation of the roll 11a carrying the material in the hopper downwardly between the rolls. These orifices of the die determine the size and shape of the extruded object. In one form of the invention, a cut-off wire 14, see also FIGURE 5, is carried by a plurality of fingers 15 mounted on a shaft 16 which is a part of shuttle mechanism generally indicated at 17 so that as the mechanism 17 reciprocates, the wire 14 will be carried back and forth beneath the orifices of die 12 whereby to cut off the extruded objects. At its extremities the wire 14 is fixed to enlarged finger members 18 which form a part of the shuttle mechanism 17.

A motor 19 carried by the frame 10 furnishes the power for the various moving mechanisms. The belt 13, for example, is driven by the motor 19 through the pulley 20, other gearing not shown, the large gear 21, the small gear 22 and the belts 23, 24 and chain 25 connected to a sprocket gear (not shown) on the end of belt drive roll 26. The belt 13 passes under and around the belt drive roll 26, and then over idler roll 27, returning through the main housing 10.

The shuttle mechanism 17 is also actuated by the motor 19. To this end the driving link 28 is connected to the gear 21 by a crank pin 29. This link 28 is also connected to the rocker shaft lever 30 by means of a pivot pin (not shown) or any other suitable and conventional connecting means. The rocker shaft lever 30 is in turn connected to the rocker shaft 31. The shuttle mechanism 17 includes a member 17a which is operatively connected to the rocker shaft 31, see FIGURE 4. Rotation of the gear 21 by the motor 19 will, through the mechanism just described, result in reciprocation of the shuttle mechanism 17 and wire 14 in a manner which is old and well known in the art.

From the foregoing it will be apparent that as material is extruded from the orifices of die 12 the reciprocating wire 14 will cut through the extruded material so that the formed objects may then drop onto the constantly moving belt 13. As indicated earlier, an important object of this invention is to provide means for controlling the drop of these objects onto the belt 13 in accordance with the various requirements of objects having different size, shape and material characteristics. These control mechanisms will now be described.

One of the control features of this invention includes a platen 32 extending beneath the belt 13 in its upper flight. The platen 32 is supported at its ends which lie outside the area occupied by the belt. One of these end supports, see especially FIGURE 3, is the push rod 33. The rod 33 is reciprocable within the push rod bracket 34. A push rod link 35 connects the rod 33 to the actuating lever 36. A cam lever 37 having a cam arm 37a is pinned to the actuating lever as indicated at 38. A cam follower 39 on the cam lever 37 engages the cam 40 which is mounted on a shaft 41 driven by the motor 19 through the mechanism earlier described in connection with the gear 21. It will be apparent that as the shaft 41 is rotated, and the cam 40 with it, reciprocation of the rod 33 will be effected through the linkage 35, 36 and 37. The amount of reciprocation is controlled by the cam member 42 which engages the cam arm 37a. This member 42 is mounted on the lever pivot shaft 43, see also FIGURE 2.

Referring now to FIGURES 2 and 3, further detail of the control for the position of the platen 32 will be given. The actuating lever 36 is keyed to the shaft 43 as indicated at 44. The cam or eccentric 42 is a part of the sleeve 45 having the flange 46, the sleeve 45 being mounted in the housing 10 through the bushing 45a. An adjustable locating collar 47 is also keyed to the shaft 43. The collar 47 carries a locating pin 48 by means of which the sleeve 45 may be connected to the shaft 43 through the collar 47.

When it is desired to change the amount of movement imparted to the rod 33 and platen 32, the operator will loosen the locating pin 48 and rotate the eccentric 42 (via the flange 46 of the sleeve 45) with respect to the collar 47 which is keyed to shaft 43. This has the effect of allowing lever 37 with roller 39 to move away from the cam 40, these members thus receiving movement only on the top portion of cam 40. This results in the platen 32 not moving to its top-most position. There are several positions at which the locating screw can locate the sleeve 45 and its eccentric 42. When the sleeve 45 is thus again connected to the shaft 43 by means of the locating pin 48 in the collar 47 engaging the flange 46, rotation of the platen cam 40 will produce a different amount of reciprocation for the rod 33 as governed by this new position of the cam lever 37 as occasioned by the change in relationship between the cam 42 and cam arm 37a. By this arrangement very fine adjustments in the height to which the platen 32 is raised can easily be made.

It will be understood that the drives from the motor 19 to the mechanisms for horizontally reciprocating the wire 14 (or knife to be described) and vertically reciprocating the platen 32, as previously described will be so arranged and timed that the platen 32 will be in its uppermost position at the time the wire or knife cuts off the objects extruded from the dies 12 so that the distance these objects must fall is at a minimum. If platen movement is not required the platen 32 can be lifted off rod 33 and slid out from under belt 13. When this platen movement is desired or required, changes in the extent to which the platen 32 is moved are easily and rapidly effected by manipulating the flange 46 of the sleeve 45 and its eccentric 42 in the manner previously described.

Another of the controls which is a part of this invention is that by which the motion of the cut-off wire or knife may be adjusted so that it will drop away from the orifices of die 12 immediately after the wire or knife has completed its cut. This insures a more uniform, in line, deposit of the objects onto the moving belt 13. To this end an arm 49 is connected to the shaft 16, see FIGURES 4, 5 and 6. This arm 49 will reciprocate along with the wire 14, fingers 15, shaft 16 and the shuttle mechanism 17—18. The arm 49 carries a member 50 at one end which rides on the cut-off track generally indicated at 51. The cut-off track 51 has a first indentation beginning at 51a and a second indentation beginning at 51b. The member 50 is of sufficient length to extend across the indentation which begins at 51a but it will not extend across the indentation which begins at 51b. The indentation which commences at 51a is designated at 52 and that which commences at 51b is designated at 53. Slidably mounted within the indentation 52 is the adjustable cut-off track 54, the upper surface of which is flush with the upper surface of the cut-off track 51. The member 54 has a rod 55 which extends through a horizontal slot 56 in the main cut-off track 51. The member 54 is maintained in desired position by means of the adjustable knob 57 threaded thereon.

The complete cut-off track assembly, including the main cut-off track 51, the adjustable cut-off track 54 and the clamping knob 57, is pivotally mounted to the frame as indicated at 58. A spring 59 urges the cut-off track 51 to the position shown in the various figures. A lower, return track 60 is pivoted to the frame as indicated at 61. The track 60 lies beneath the indentation 52 provided in the main cut-off track 51 and it extends beyond the adjustable cut-off track 54 even when it is in its farthest position to the right, as viewed in FIGURE 6.

The end of the lower, return track 60 which is opposite the pivot point 61 rests on a drop adjustment cam 62. The cam 62 is shown as having two different flats and an arcuate surface, thus making possible three different positions for the track 60. It will be apparent that more may be supplied if desired. The spring 59 earlier mentioned also serves to urge the track 60 into contact with the cam 62. An adjustment knob 63 is provided by means of which the cam 62 may be located in any of its three positions as desired.

Movement of the shuttle mechanism including the members 15, 16, 17, 18 and the wire 14 carried thereby, is controlled by the arm 49 and its member 50. The wire 14 will advance towards and past the orifices of die 12 as the member 50 slides across the top of the cut-off track 51–54. When the member 50 comes to the end of the cut-off track 54 it will drop onto the lower, return track 60. This terminates advance of the wire 14 along the die surface 12 and, when the member 50 drops onto the track 60, the wire 14 moves downwardly a like amount. It will be apparent, therefore, that the members 54 and 60 make possible additional control for movement of the wire 14 in relation to the die opening. By loosening the knob 57 and sliding the member 54 to the left, as viewed in FIGURE 6, the distance through which the wire 14 is moved is lessened for the member 50 will drop onto the track 60 sooner than when the adjustable cut-off track 54 is more to the right, as viewed in this figure. Also, depending on the position of the drop adjustment cam 62, the distance through which the member 50— and the member 14 therewith—drops is also varied. When, for example, the member 62 is moved so that its arcuate surface engages the return track 60, this track will be in its highest position which means that the member 50 and wire 14 will have a shorter distance to drop when the end of the adjustable track 54 is reached.

From all of the foregoing it will be seen that the cut-off and drop of the objects extruded from the dies 12 may be controlled by three different but closely related mechanisms. First, there is the position of the platen 32 with respect to the dies 12 whereby the belt 13 may be brought closer to or farther away from these dies, if desired. Second, there is the means 54 by which the length of the stroke of the wire 14 is controlled so that, according to the size of the objects extruded from the dies 12, the wire 14 (or knife to be described) can be arranged to stop its forward movement immediately after the objects have been severed from the dies. Third, there is the means 60 and 62 by which the height of cut-off wire drop may be adjusted depending on the height or thickness of the various objects cut from the dies. All of these cooperate together to insure that the objects severed from the dies will fall in proper position on the belt 13.

The arrangement of the various transmission means from the motor 19 is such that the shuttle mechanism 17 for moving the wire 14 is in timed relation to the cam 40 and its associated mechanism for raising and lowering the platen 32. It is preferred, for example, that the wire or knife 14 complete its cut of the objects from the dies 12 just as the platen 32 has reached its uppermost position, the wire 14 or knife then dropping as the platen 32 is lowered. In this manner the wire 14 or knife does not interfere with the objects after they have been severed from the die nor will it come into contact with the belt 13. The objects will drop correct side up and in line. The cam control 42 is utilized to adjust movement of the platen 32, the adjustable cut-off track 54 is utilized to control the stroke of the wire 14 and the cam control 62 is utilized to control the amount of drop of the wire 14 or knife after the objects have been severed. These controls will be varied according to the shape of the objects being extruded, with particular reference to the thickness of such objects and their width as measured in the direction of the cut-off stroke of the wire 14 or knife.

A modification of the invention is shown in FIGURES 8 through 10. Essentially all that has been done in this modification is to substitute a longitudinally reciprocating knife 80 for the wire 14. This knife 80 is fastened at one of its ends (the right end as viewed in FIGURE 8) to an arm 81 pivotally mounted on one of the members 18 as indicated at 82. At its other end the knife 80 is supported in a bracket 83 fixed on the other of the members 18 so that the knife may reciprocate within the bracket 83. This bracket 83, therefore, is slotted to receive the knife 80. This knife is spring loaded to keep it in tension. This is accomplished by the spring 84 which is fastened to the knife and to a tension adjustment member 85 located in the left hand member 18 as viewed in FIGURE 8.

The knife is reciprocated longitudinally along its axis quite rapidly in order to give it a saw action as the shuttle mechanism previously described, including the members 18, causes the knife to move back and forth under the dies. This is accomplished by a motor 86 having a rapidly rotating eccentric 87 which is linked to the arm 81 by a link member 88.

In the modification of FIGURES 8–10 the knife is given a saw action by the motor 86 through the eccentric 87, link 88 and arm 81. This takes place while the knife is also moved back and forth beneath the dies. The spring 84 which keeps the relatively thin knife 80 in tension insures that the knife will actually reciprocate longitudinally rather than just bend or buckle.

It is believed that the operation of the invention has been clearly described in the foregoing passages, and, therefore, a further description is believed unnecessary at this point. It is to be understood that modifications may be made in this invention without departing from the scope and spirit thereof. It is also to be understood that while the invention has been shown as embodied in certain particular mechanisms and arrangements, these mechanisms and arrangements are not to be considered a limitation on the invention except insofar as they are specifically set forth in the subjoined claims.

Having thus described the invention, what is claimed as new and what is desired to be protected by United States Letters Patent is:

1. In a depositor comprised of a hopper, a die, means for extruding material from said hopper through said die, a cut-off member for cutting the extruded material from said die, a moving belt to receive the cut material, and a motor and transmission means for actuating the extrusion means, the belt and the cut-off member, the improvement which comprises: a platen located beneath said belt and under said die, means to move said platen toward said die in timed relation with said cut-off member so that said belt is closest to said die when said cut-off member passes through the extruded material, a shuttle mechanism in which said cut-off member is mounted, a cut-off track, said shuttle mechanism including a control member which rides on said track, the stroke of said cut-off member and shuttle mechanism being dependent on contact of said control member on said cut-off track, means to vary the length of said cut-off track, a return track extending under said cut-off track and positioned to receive said control member when it drops off the end of said cut-off track, and means to move said return track toward and away from said cut-off track.

2. The improved depositor of claim 1 in which said means to move said return track comprises a cam member underlying said return track, means to move said cam member, and means to lock said cam member in place.

3. The improved depositor of claim 2 including first control means for varying the distance through which said platen moves; said platen moving means including a cam rotated by said motor, a vertical rod engaging said platen, a bracket in which said rod is slidable, a first lever pivotally connected to said rod, a second lever pivotally connected to said first lever, a shaft in said depositor, said first lever being fixed to said shaft, and said second lever having a cam follower engaging said cam; said first control means including an extension on said second lever adjacent said shaft and said first lever, a second cam engaging said extension, and means to move said second cam whereby to effect a change in the position of said first and said second levers, so as to vary the distance through which said platen moves; and said cut-off track comprises an elongated member having a first recess in one side thereof, and a second recess in the same side and extending from and beyond said first recess, said member of said shuttle mechanism bridging said first recess but not said second recess, the means to vary the length of said track comprising a second cut-off track slidable in said first recess, and means to lock said second cut-off track in desired position.

4. The depositor of claim 1 including means to reciprocate said cut-off member longitudinally along its axis.

5. In a depositor comprised of a hopper, a die, means for extruding materials from said hopper through said die, a cut-off member for cutting the extruded material from said die, a moving belt to receive the cut material, and a motor and transmission means for actuating the extrusion means, the belt and the cut-off member, the improvement which comprises: a platen located beneath said belt and under said die, means to move said platen toward said die in timed relation with said cut-off member so that said belt is closest to said die when said cut-off member passes through the extruded material, said platen moving means including a cam rotated by said motor, a vertical rod fixed to said platen, a bracket in which said rod is slidable, a first lever pivotally connected to said rod, a second lever pivotally connected to said first lever, a shaft in said depositor, said first lever being fixed to said shaft, and said second lever having a cam follower engaging said cam, and control means for varying the distance through which said platen moves, said control means including an extension on said second lever adjacent said shaft and said first lever, a second cam engaging said extension, and means to move said second cam whereby to effect a change in the position of said first and second levers so as to vary the distance through which said platen moves.

6. The depositor of claim 5 including means to reciprocate said cut-off member longitudinally along its axis.

7. In a depositor comprised of a hopper, a die, means for extruding material from said hopper through said die, a cut-off member for cutting the extruded material from said die, a moving belt to receive the cut material, and a motor and transmission means for actuating the extrusion means, the belt and the cut-off member, the improvement which comprises: a platen located beneath the said belt and under said die, means to move said platen toward said die in timed relation with said cut-off member, so that said belt is closest to said die when said cut-off member passes through the extruded material, a shuttle mechanism in which said cut-off member is mounted, a cut-off track, said shuttle mechanism including a control member which rides on said track, the stroke of said cut-off member and shuttle mechanism being dependent on contact of said control member on said cut-off track, said cut-off track comprising an elongated member having a first recess in one side thereof and a second recess in the same side and extending from and beyond said first recess, said control member of said shuttle mechanism bridging said first recess but not said second recess, and means to vary the length of said cut-off track, said length varying means comprising a second cut-off track slidable in said first recess, and means to lock said second cut-off track in a desired position.

References Cited in the file of this patent

UNITED STATES PATENTS

| | | |
|---|---|---|
| 970,370 | Green | Sept. 13, 1910 |
| 1,932,345 | Kremmling | Oct. 24, 1933 |
| 2,238,164 | Edwards | Apr. 15, 1941 |
| 2,582,542 | Hein | Jan. 15, 1952 |
| 3,073,201 | Thumim | Jan. 15, 1963 |